(12) United States Patent
Kwak et al.

(10) Patent No.: US 10,200,628 B2
(45) Date of Patent: Feb. 5, 2019

(54) ELECTRONIC DEVICE AND METHOD FOR CAPTURING IMAGE BY USING DISPLAY

(71) Applicant: Samsung Electronics Co., Ltd., Suwon-si, Gyeonggi-do (KR)

(72) Inventors: Sungyoung Kwak, Hwaseong-si (KR); Hongsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 15/388,403

(22) Filed: Dec. 22, 2016

(65) Prior Publication Data
US 2017/0244875 A1 Aug. 24, 2017

(30) Foreign Application Priority Data
Feb. 19, 2016 (KR) .......................... 10-2016-0019472

(51) Int. Cl.
| | |
|---|---|
| *H04N 5/222* | (2006.01) |
| *H04N 5/235* | (2006.01) |
| *G09G 5/00* | (2006.01) |
| *G09G 5/02* | (2006.01) |
| *H04N 5/225* | (2006.01) |
| *H04N 5/232* | (2006.01) |

(52) U.S. Cl.
CPC .............. *H04N 5/2354* (2013.01); *G09G 5/00* (2013.01); *G09G 5/003* (2013.01); *G09G 5/02* (2013.01); *H04N 5/2257* (2013.01); *H04N 5/23216* (2013.01); *H04N 5/23293* (2013.01); *G09G 2320/0626* (2013.01); *G09G 2320/0666* (2013.01); *G09G 2320/08* (2013.01); *G09G 2360/144* (2013.01)

(58) Field of Classification Search
CPC ............... H04N 5/2354; H04N 5/2257; H04N 5/23293; H04N 5/23216; G09G 5/00; G09G 5/02; G09G 5/003; G09G 2320/08; G09G 2360/144; G09G 2320/0666; G09G 2320/0626
See application file for complete search history.

(56) References Cited

U.S. PATENT DOCUMENTS

| | | | |
|---|---|---|---|
| 8,970,776 B2 | 3/2015 | Ciudad et al. | |
| 9,571,745 B2* | 2/2017 | Mahowald | ......... H04N 5/23232 |
| 9,635,255 B1* | 4/2017 | Baldwin | ............ H04N 5/23241 |
| 2013/0050233 A1* | 2/2013 | Hirsch | .................... G06F 3/038 |
| | | | 345/589 |
| 2014/0293134 A1* | 10/2014 | Hung | ..................... H04N 5/205 |
| | | | 348/624 |

(Continued)

*Primary Examiner* — Lin Ye
*Assistant Examiner* — John H Morehead, III
(74) *Attorney, Agent, or Firm* — Jefferson IP Law, LLP

(57) ABSTRACT

An electronic device for capturing an image by using a display is provided. The electronic device includes a display, a display controller configured to operate the display using a first lighting parameter and a second lighting parameter to generate an afterimage effect for objects included in images, a camera configured to capture an image to be displayed by the display, and a processor configured to determine a camera operation parameter corresponding to a final lighting parameter of the display for a capture operation of the camera. Therefore the electronic device according to various embodiments of the present disclosure can capture a high quality image in a dark environment.

18 Claims, 16 Drawing Sheets

(56) References Cited

U.S. PATENT DOCUMENTS

| | | | |
|---|---|---|---|
| 2015/0002735 A1* | 1/2015 | Moskovchenko | H04N 5/2354 348/370 |
| 2015/0189138 A1* | 7/2015 | Xie | H04N 5/2256 348/222.1 |
| 2015/0201130 A1* | 7/2015 | Cho | H04N 5/23293 348/333.05 |
| 2015/0334292 A1* | 11/2015 | Tartz | G08B 6/00 348/222.1 |
| 2016/0094763 A1* | 3/2016 | Patel | H04N 5/2256 348/333.13 |
| 2016/0225301 A1* | 8/2016 | Scepanovic | G09G 3/32 |

* cited by examiner

ELECTRONIC DEVICE AND METHOD FOR CAPTURING IMAGE BY USING DISPLAY

CROSS-REFERENCE TO RELATED APPLICATION(S)

This application claims the benefit under 35 U.S.C. § 119(a) of a Korean patent application filed on Feb. 19, 2016 in the Korean Intellectual Property Office and assigned Serial number 10-2016-0019472, the entire disclosure of which is hereby incorporated by reference.

TECHNICAL FIELD

The present disclosure relates to an electronic device and a method for capturing an image by using a display. More particularly, the present disclosure relates to a technology for photographing an object by using an illumination of a display itself.

BACKGROUND

Various electronic devices such as a smartphone, tablet personal computer (PC), portable multimedia player (PMP), personal digital assistant (PDA), laptop PC, and wearable device can provide various functions such as a social networking service (SNS), Internet, multimedia, photo/video capture and play, and documentation task as well as a telephone function.

In particular, the culture of photographing a user's own face by using a front camera installed in an electronic device is growing rapidly. However, there are difficulties in capturing an image with the front camera in a dark place because the front camera is not equipped with a lighting device.

In order to overcome these difficulties, photographing technologies of using a light source of a display are being developed in the field of photographing an image by using a front camera.

The above information is presented as background information only to assist with an understanding of the present disclosure. No determination has been made, and no assertion is made, as to whether any of the above might be applicable as prior art with regard to the present disclosure.

SUMMARY

Technologies of capturing an image by using a light source of a display detect information about the adjacent environment and control the brightness of the display according to the detected environmental information according to the related art. It is possible to control the brightness by adjusting an electric current supplied to the display and to use a white screen as a lighting according to the related art. A lighting condition of the display must be re-adjusted to obtain an optimum lighting condition by using a white screen, and camera operation parameters are generally used before using the lighting. In this situation, if a user intends to photograph by using a front camera in a dark space, problems may be generated because focusing is performed unnaturally and incorrectly.

Aspects of the present disclosure are to address at least the above-mentioned problems and/or disadvantages and to provide at least the advantages described below. Accordingly, an aspect of the present disclosure is to provide an electronic device and a method for capturing an image naturally in a dark space.

In accordance with an aspect of the present disclosure, an electronic device is provided. The electronic device includes a display, a display controller configured to operate the display using a first lighting parameter and a second parameter to generate an afterimage effect for objects included in images, a camera configured to capture an image to be displayed by the display, and a processor configured to determine a camera operation parameter corresponding to a final lighting parameter of the display for a capture operation of the camera.

In accordance with another aspect of the present disclosure, a method is provided. The method for capturing an image by using a display of an electronic device includes controlling the display to operate using a first lighting parameter and a second lighting parameter to generate an afterimage effect for an object included in the image, capturing an image to be displayed by the display, and determining a camera operation parameter corresponding to a final lighting parameter of the display for a capture operation of the camera.

The electronic device and the method for capturing an image by using a display according to various embodiments of the present disclosure enables a user to compose and adjust an image easily by changing a lighting output by a display gradually and displaying an afterimage of an object type for the user.

The electronic device and the method for capturing an image by using a display according to various embodiments of the present disclosure can extract optimum camera operation parameters by capturing an image with an obtained camera operation parameter and obtaining a new camera operation parameter from the captured image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
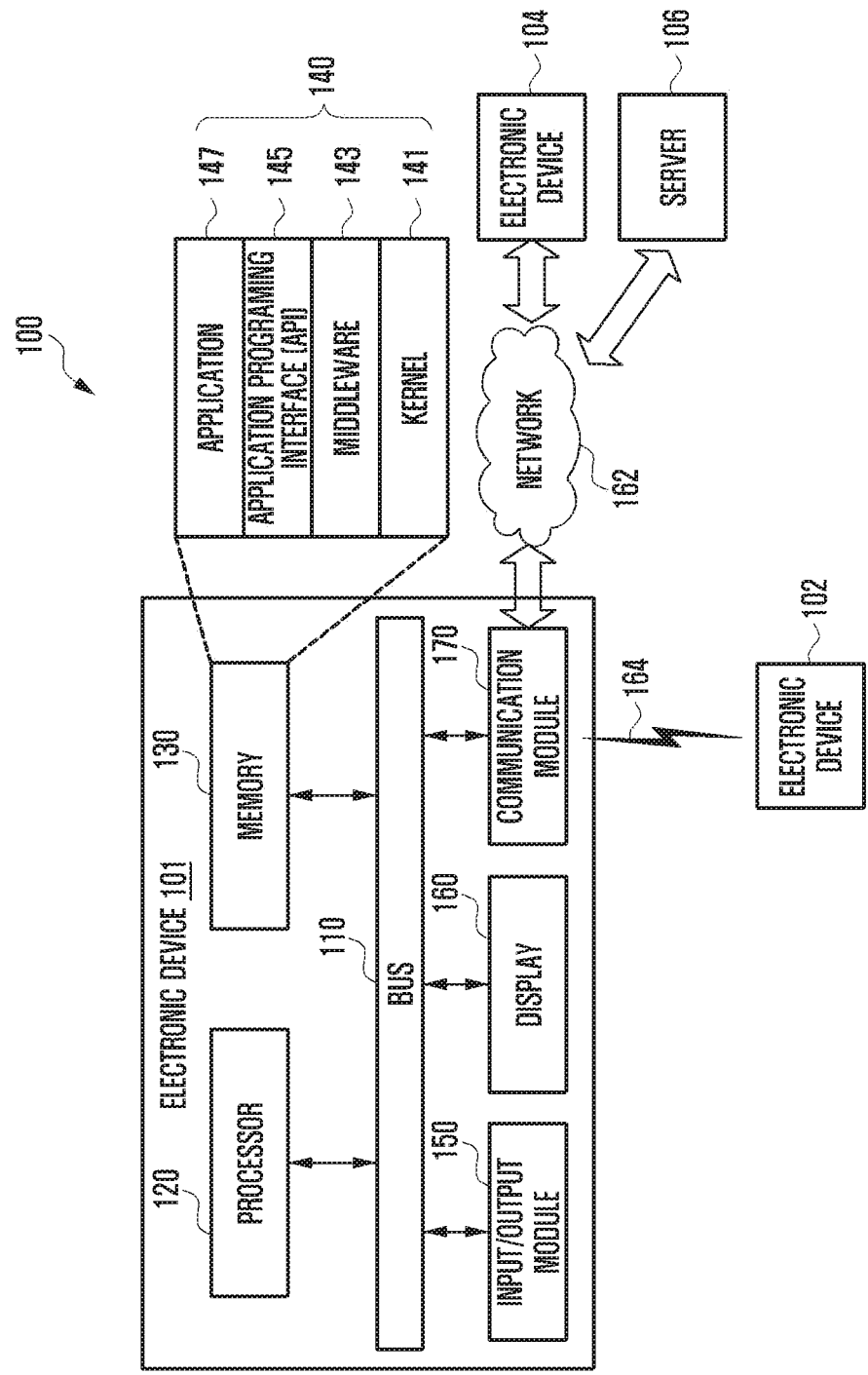
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions, such as "include" and "may include" which may be used in the present disclosure denote the presence of the disclosed functions, operations, and constituent elements and do not limit one or more additional functions, operations, and constituent elements. In an embodiment of the present disclosure, the terms, such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In an embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments of the present disclosure, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a digital versatile disc (DVD) player, an audio device, various medical devices (for example, magnetic resonance angiography (MRA), magnetic resonance imaging (MRI), computed tomography (CT), a scanning machine, an ultrasonic wave device, and the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram illustrating a configuration of an electronic device according to an embodiment of the present disclosure.

Referring to FIG. 1, an electronic device 100 may include a bus 110, a processor 120, a memory 130, an input/output (I/O) module 150, a display module 160, a communication module 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, the I/O module 150, the display module 160, the communication module 170, and the like) through the bus 110, may interpret the received commands, and may execute calculation or data processing according to the interpreted commands.

The memory 130 may store commands or data received from the processor 120 or other elements (e.g., the I/O module 150, the display module 160, the communication module 170, and the like) or generated by the processor 120 or the other elements. The memory 130 may include programming modules, such as a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, and the like) used to execute operations or functions implemented by other programming modules (e.g., the middleware 143, the API 145, and the application 147). In addition, the kernel 141 may provide an interface capable of accessing and controlling or managing the individual elements of the electronic device 100 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. In addition, in relation to work requests received from one or more applications 140 and/or the middleware 143, for example, the middleware 143 may perform load balancing of the work requests by using a method of assigning a priority, in which system resources (e.g., the bus 110, the processor 120, the memory 130, and the like) of the electronic device 100 are allocated, to at least one of the one or more applications 140.

The API 145 is an interface through which the application 147 is capable of controlling a function provided by the kernel 141 or the middleware 143, and may include, for example, at least one interface or function for file control, window control, image processing, character control, and the like.

The I/O module 150, for example, may receive a command or data as input from a user, and may deliver the received command or data to the processor 120 or the memory 130 through the bus 110. The display module 160 may display a video, an image, data, and the like, to the user.

The communication module 170 may connect communication between another electronic device 102 and the electronic device 100. The communication module 170 may support a short-range communication protocol 164 (e.g., Wi-Fi, Bluetooth (BT), and near field communication (NFC)), or a network 162 (e.g., the Internet, a local area network (LAN), a wide area network (WAN), a telecommunication network, a cellular network, a satellite network, a plain old telephone service (POTS), and the like). Each of the electronic devices 102 and 104 may be identical (e.g., of an identical type) to or different (e.g., of a different type) from the electronic device 100. Further, the communication module 170 may connect communication between a server 106 and the electronic device 100 via the network 162.

Figure 2:
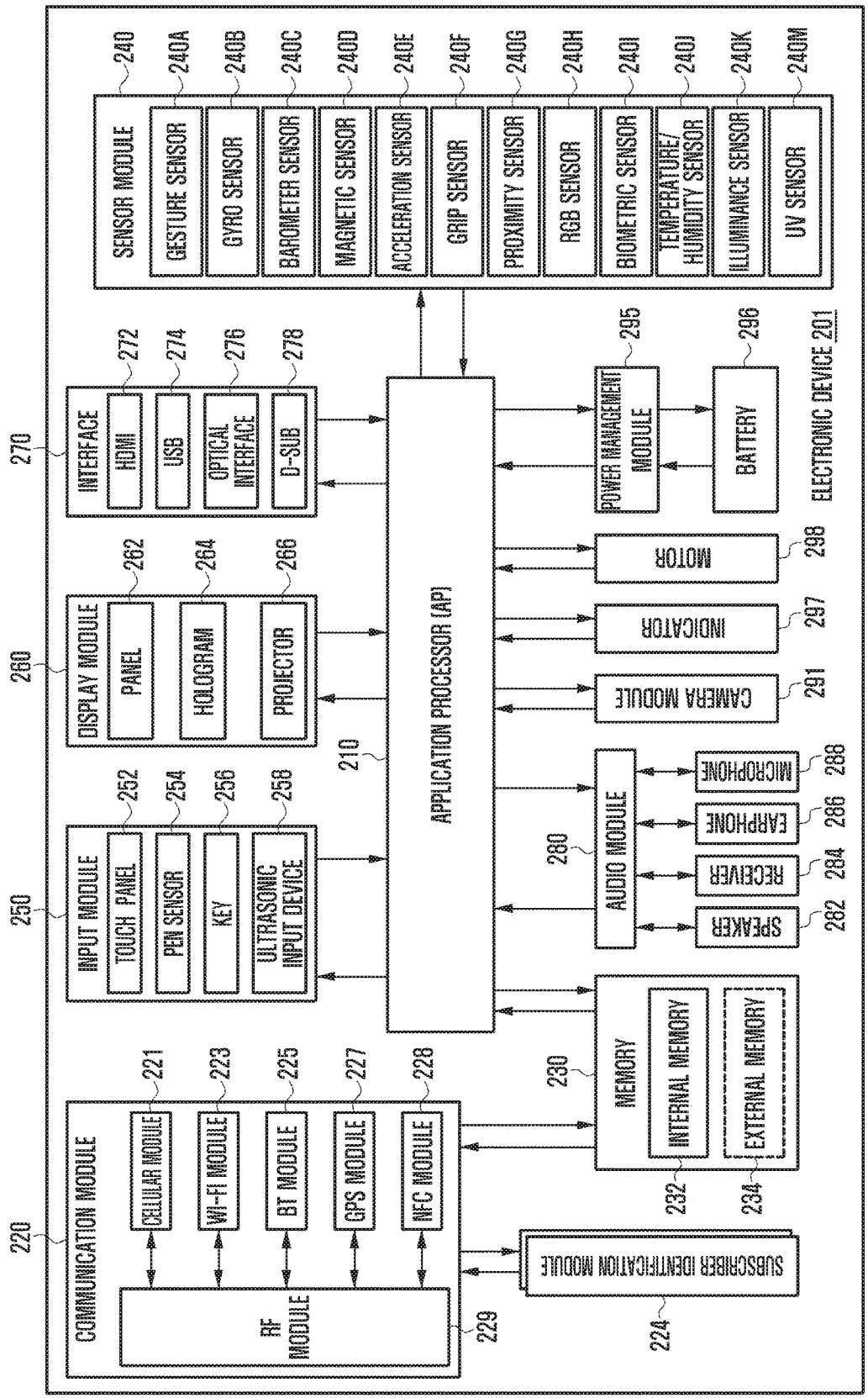
FIG. 2 is a block diagram illustrating a configuration of an electronic device according to various embodiments of the present disclosure.

FIG. 2 is a block diagram illustrating a configuration of an electronic device according to an embodiment of the present disclosure.

Referring to FIG. 2, an electronic device 201 may be, for example, the electronic device 100 illustrated in FIG. 1.

The electronic device 201 may include one or more processors 210, a subscriber identification module (SIM) card 224, a memory 230, a communication module 220, a sensor module 240, a user input module 250, a display module 260, an interface 270, an audio module 280, a camera module 291, a power management module 295, a battery 296, an indicator 297, a motor 298 and any other similar and/or suitable components.

The processor 210 (e.g., the processor 120) may include one or more application processors (APs), or one or more communication processors (CPs). The processor 210 may be, for example, the processor 120 illustrated in FIG. 1. The AP and the CP are illustrated as being included in the processor 210 in FIG. 2, but may be included in different integrated circuit (IC) packages, respectively. According to an embodiment of the present disclosure, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the present disclosure, the processor 210 may further include a graphics processing unit (GPU) (not illustrated).

The CP may manage a data line and may convert a communication protocol in the case of communication between the electronic device (e.g., the electronic device 100) including the electronic device 201 and different electronic devices connected to the electronic device through the network. The CP may be implemented by, for example, an SoC. According to an embodiment of the present disclosure, the CP may perform at least some of multimedia control functions. The CP, for example, may distinguish and authenticate a terminal in a communication network by using a SIM (e.g., the SIM card 224). In addition, the CP may provide the user with services, such as a voice telephony call, a video telephony call, a text message, packet data, and the like.

Further, the CP may control the transmission and reception of data by the communication module 220. In FIG. 2, the elements, such as the CP, the power management module 295, the memory 230, and the like are illustrated as elements separate from the AP. However, according to an embodiment of the present disclosure, the AP may include at least some (e.g., the CP) of the above-described elements.

According to an embodiment of the present disclosure, the AP or the CP may load, to a volatile memory, a command or data received from at least one of a non-volatile memory and other elements connected to each of the AP and the CP, and may process the loaded command or data. In addition, the AP or the CP may store, in a non-volatile memory, data received from or generated by at least one of the other elements.

The SIM card 224 may be inserted into a slot formed in a particular portion of the electronic device 100. The SIM card 224 may include unique identification information (e.g., integrated circuit card identifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, and the like). According to an embodiment of the present disclosure, the internal memory 232 may be in the form of a solid state drive (SSD). The external memory 234 may further include a flash drive, for example, a compact flash (CF), a secure digital (SD), a micro-SD, a mini-SD, an extreme digital (xD), a memory stick, and the like.

The communication module 220 may include a communication module 220 including a radio frequency (RF) module 229. The communication module 220 may be, for example, the communication module 160 illustrated in FIG. 1. The communication module 220 may include, for example, a Wi-Fi module 223, a BT module 225, a GPS module 227, and a NFC module 228. For example, the communication module 220 may provide a wireless communication function by using an RF. Additionally or alternatively, the communication module 220 may include a network interface (e.g., a LAN card), a modulator/demodulator (modem), and the like for connecting the electronic device 201 to a network (e.g., the Internet, a LAN, a WAN, a telecommunication network, a cellular network, a satellite network, a POTS, and the like).

The communication module 220 (e.g., the communication module 170) may perform data communication with other electronic devices (e.g., the electronic device 104 and the server 106) through a network. According to an embodiment of the present disclosure, the communication module 220 may include a cellular module 221, a Wi-Fi module 223, a BT module 225, a GPS module 227, an NFC module 228, and an RF module 229.

The RF module 229 may be used for transmission and reception of data, for example, transmission and reception of RF signals or other electronic signals. Although not illustrated, the RF module 229 may include, for example, a transceiver, a power amplifier module (PAM), a frequency filter, a low noise amplifier (LNA), and the like. In addition, the RF module 229 may further include a component for transmitting and receiving electromagnetic waves in a free space in a wireless communication, for example, a conductor, a conductive wire, and the like.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and an ultra violet (UV) sensor 240M. The sensor module 240 may measure a physical quantity or may detect an operating state of the electronic device 201, and may convert the measured or detected information to an electrical signal. Additionally/alternatively, the sensor module 240 may include, for example, an Electronic nose (E-nose) sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. The sensor module 240 may further include a control circuit (not illustrated) for controlling one or more sensors included therein.

The user input module 250 may include a touch panel 252, a pen sensor 254 (e.g., a digital pen sensor), keys 256, and an ultrasonic input device 258. The user input module 250 may be, for example, the I/O module 150 illustrated in FIG. 1. The touch panel 252 may recognize a touch input in at least one of, for example, a capacitive scheme, a resistive scheme, an infrared scheme, and an acoustic wave scheme. In addition, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input device 258 enables the terminal to detect a sound wave by using a microphone (e.g., a microphone 288) of the terminal through a pen generating an ultrasonic signal, and to identify data. The ultrasonic input device 258 is capable of wireless recognition. According to an embodiment of the present disclosure, the electronic device 201 may receive a user input from an external device (e.g., a network, a computer, or a server), which is connected to the communication module 220, through the communication module 220.

The display module 260 may include a panel 262, a hologram 264, and a projector 266. The display module 260 may be, for example, the display module 160 illustrated in FIG. 1. The panel 262 may be, for example, a liquid crystal display (LCD) and an active matrix organic light emitting diode (AM-OLED) display, and the like. The panel 262 may be implemented so as to be, for example, flexible, transparent, or wearable. The panel 262 may include the touch panel 252. The hologram 264 may display a three-dimensional image in the air by using interference of light. The projector 266 is configured to project images onto a surface. According to an embodiment of the present disclosure, the display module 260 may further include a control circuit for controlling the panel 262, the hologram 264, and the projectors 266.

The interface 270 may include various connection such as, for example, a high-definition multimedia interface (HDMI) 272, a universal serial bus (USB) 274, an optical interface 276, and a d-subminiature (D-sub) 278. Additionally or alternatively, the interface 270 may include, for example, SD/multi-media card (MMC) (not illustrated) or infrared data association (IrDA) (not illustrated).

An audio module 280 may bidirectionally convert between a voice and an electrical signal. The audio module 280 may convert voice information, which is input to or output from the audio module 280, through, for example, a speaker 282, a receiver 284, an earphone 286, the microphone 288, and the like.

The camera module 291 may capture an image and a moving image. According to an embodiment of the present disclosure, the camera module 291 may include one or more image sensors (e.g., a front lens or a back lens), an image signal processor (ISP) (not illustrated), and a flash LED (not illustrated).

The power management module 295 may manage power of the electronic device 201. Although not illustrated, the power management module 295 may include, for example, a power management IC (PMIC), a charger IC, or a battery fuel gauge.

The PMIC may be mounted to, for example, an IC or an SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, and the like) for wireless charging may be added to perform the wireless charging.

The battery fuel gauge may measure, for example, a residual quantity of the battery 296, or a voltage, a current, and a temperature during the charging. The battery 296 may supply power by generating electricity, and may be, for example, a rechargeable battery.

The indicator 297 may indicate particular states of the electronic device 201 or a part (e.g., the AP) of the electronic device 201, for example, a booting state, a message state, a charging state and the like. The motor 298 may convert an electrical signal into a mechanical vibration. The processor 210 may control the sensor module 240.

Although not illustrated, the electronic device 201 may include a processing unit (e.g., a GPU) for supporting a mobile TV. The processing unit for supporting a mobile TV may process media data according to standards, such as, for example, digital multimedia broadcasting (DMB), digital video broadcasting (DVB), media flow, and the like. Each of the above-described elements of the electronic device 201 according to an embodiment of the present disclosure may include one or more components, and the name of the relevant element may change depending on the type of electronic device. The electronic device 201 according to an embodiment of the present disclosure may include at least one of the above-described elements. Some of the above-described elements may be omitted from the electronic device 201, or the electronic device 201 may further include additional elements. In addition, some of the elements of the electronic device 201 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," and the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations which have been known or are to be developed in the future.

Figure 3:
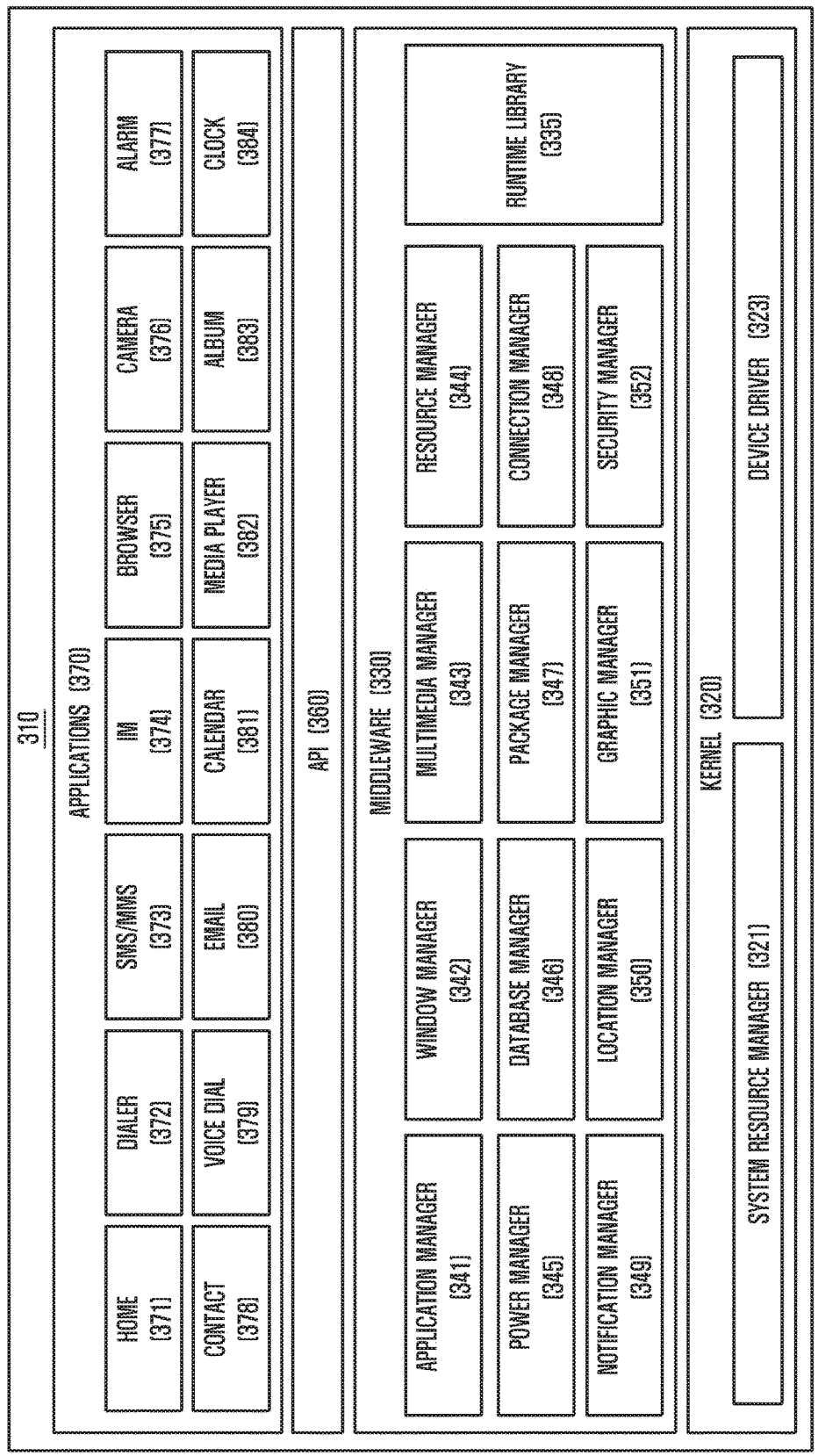
FIG. 3 is a block diagram illustrating a configuration of a program module according to various embodiments of the present disclosure.

FIG. 3 is a block diagram illustrating a configuration of a programming module according to an embodiment of the present disclosure.

Referring to FIG. 3, a programming module 310 may be included (or stored) in the electronic device 100 (e.g., the memory 130) or may be included (or stored) in the electronic device 201 (e.g., the memory 230). At least a part of the programming module 310 may be implemented in software, firmware, hardware, or a combination of two or more thereof. The programming module 310 may be implemented in hardware (e.g., the electronic device 201), and may include an OS for controlling resources related to an electronic device and/or various applications (e.g., an application 370) that are executed in the OS. For example, the OS may be Android®, iOS®, Windows®, Symbian®, Tizen®, Bala®, and the like.

Referring to FIG. 3, the programming module 310 may include a kernel 320, a middleware 330, an API 360, and/or one or more applications 370.

The kernel 320 (e.g., the kernel 141) may include a system resource manager 321 and/or a device driver 322. The system resource manager 321 may include, for example, a process manager (not illustrated), a memory manager (not illustrated), and a file system manager (not illustrated). The system resource manager 321 may perform the control, allocation, recovery, and the like of system resources. The device driver 322 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). In addition, according to an embodiment of the present disclosure, the device driver 312 may include an inter-process communication (IPC) driver (not illustrated).

The middleware 330 may include multiple modules previously implemented to provide a function used in common by the applications 370. In addition, the middleware 330 may provide a function to the applications 370 through the API 360 to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and any other suitable and/or similar manager.

The runtime library 335 may include, for example, a library module used by a complier, to add a new function by using a programming language during the execution of the application 370. According to an embodiment of the present disclosure, the runtime library 335 may perform functions which are related to input and output, the management of a memory, an arithmetic function, and the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a coder/decoder (codec) appropriate for the relevant format. The resource manager 344 may manage resources, such as a source code, a memory, a storage space, and the like of at least one of the applications 370.

The power manager 345 may operate together with a basic input/output system (BIOS), may manage a battery or power, and may provide power information and the like used for an operation. The database manager 346 may manage a database to enable the generation, search and/or change of the database to be used by at least one of the applications 370. The package manager 347 may manage the installation and/or update of an application distributed in the form of a package file.

The connection manager 348 may manage a wireless connection, such as, for example, a Wi-Fi connection and a BT connection. The notification manager 349 may display or report, to the user, an event, such as an arrival message, an appointment, a proximity alarm, and the like in such a manner as not to disturb the user. The location manager 350 may manage location information of the electronic device. The graphic manager 351 may manage a graphical effect, which is to be provided to the user, and/or a user interface related to the graphical effect. The security manager 352 may provide various security functions used for system security, user authentication, and the like. According to an embodiment of the present disclosure, when the electronic device (e.g., the electronic device 100) includes a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs to provide differentiated functions. In addition, the middleware 330 may dynamically delete some of the existing elements, or may add new elements. Accordingly, the middleware 330 may omit some of the elements described in the various embodiments of the present disclosure, may further include other elements, or may replace some of the elements with other elements, each of which performs a similar function and has a different name.

The API 360 (e.g., the API 145) is a set of API programming functions, and may be provided with a different configuration according to an OS. In the case of Android® or iOS®, for example, one API set may be provided to each platform. In the case of Tizen®, for example, two or more API sets may be provided.

The applications 370 (e.g., the applications 147) may include, for example, a preloaded application and/or a third party application. The applications 370 (e.g., the applications 147) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Names of the elements of the programming module (e.g., the programming module 310) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. In addition, some of the operations may be omitted, or other operations may be added to the operations.

Figure 4:
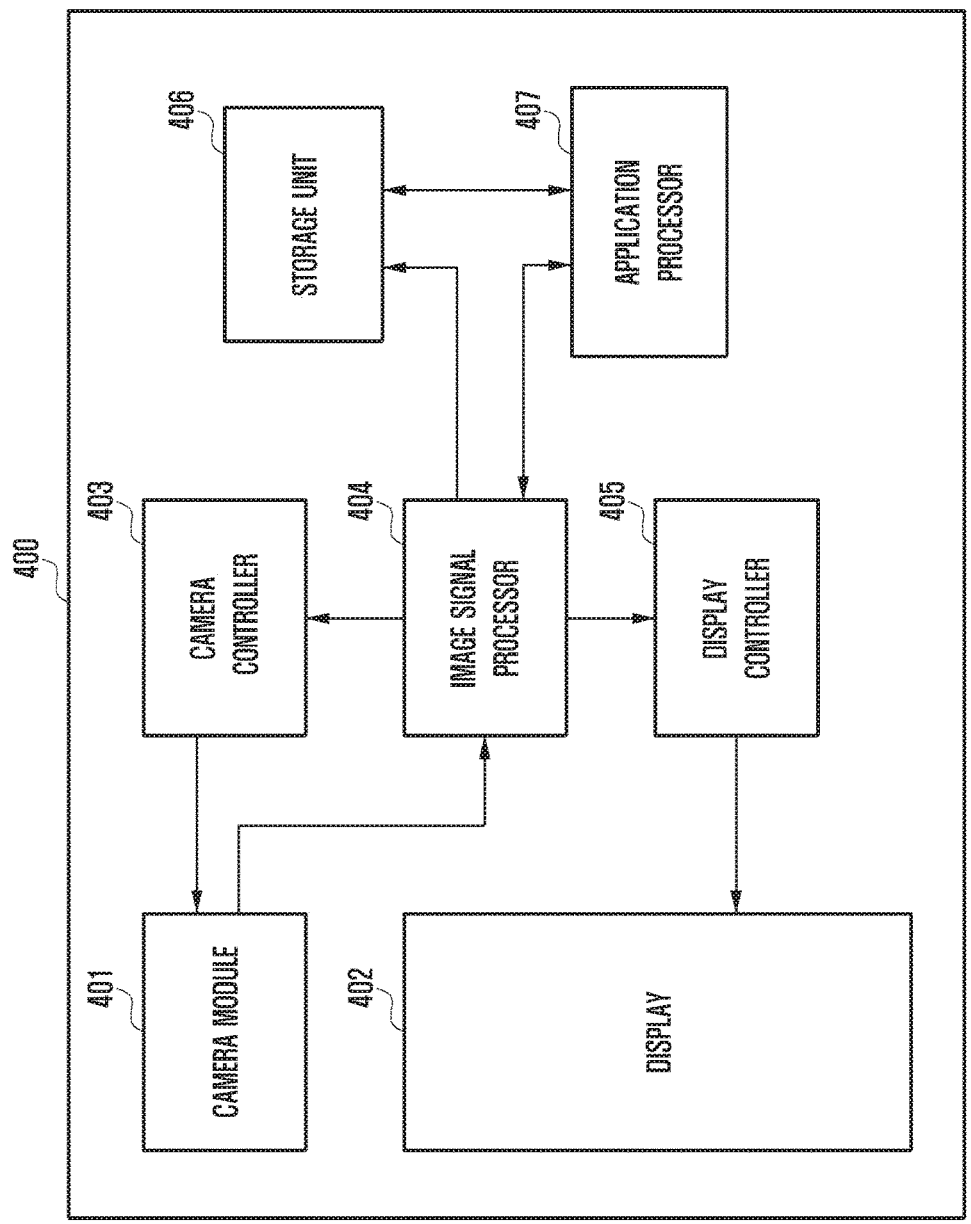
FIG. 4 is a block diagram illustrating a configuration of an electronic device according to various embodiments of the present disclosure.

FIG. 4 is a block diagram illustrating a configuration of an electronic device according to various embodiments of the present disclosure.

Referring to FIG. 4, the electronic device 400 according to an embodiment of the present disclosure may be configured with a camera module 401, a display 402, a camera controller 403, an image signal processor (ISP) 404, a display controller 405, a storage unit 406, and an AP 407.

The camera module 401 can photograph an object lit by a display.

The light output by the display reaches an object and the object can be lit by the light output by the display. Namely, the camera module 401 can photograph the object lit by the display.

The display 402 can output a screen for the electronic device.

The display controller 405 is electrically connected to the display 402 and controls the display 402 to operate by using at least 2 different lighting parameters.

The display controller 405 can adjust a brightness of the display 402 by adjusting an electric current amount or a gamma value of the display 402.

The display 402 may operate sequentially with at least 2 different lighting parameters.

A lighting parameter includes at least one of an illuminance and a color of the display 402. The lighting parameter may be configured with a first lighting parameter, a second lighting parameter, and a third lighting parameter. However the lighting parameter is not limited to the 3 lighting parameters and may be configured in a different way.

The color may include an RGB value of an image. The illuminance of the display can be adjusted by controlling each RGB value of pixels configuring an image. For example, if the RGB value of pixels configuring an image is set to 255, a white image is displayed and the illuminance of the display reaches the maximum value. Further, if the RGB value of pixels is set to 0, a black image is displayed and the illuminance of the display reaches the minimum value.

When the display operates sequentially with 2 different lighting parameters, the lighting parameter may include information of an image additionally synthesized to obtained images. For example, the lighting parameter may include contents of synthesizing a white image obtained to increase the brightness of the display.

When the display operates sequentially with 2 different lighting parameters, the lighting parameter may include a transparency of obtained images. For example, the transparency can be applied partially to the obtained images by using an application in order to increase the brightness of the display.

The display brightness corresponding to the second lighting parameter may be set greater than the display brightness corresponding to the first lighting parameter, and the display brightness corresponding to the third lighting parameter may be set greater than the display brightness corresponding to the second lighting parameter. For example, the lighting parameters may be set such that the display brightness gradually increases from the first lighting parameter to the third lighting parameter. In particular, the lighting parameter may output a white image in order to obtain the maximum brightness of the display or an image corresponding to a predetermined brightness.

However the lighting parameters may not be set to adjust the brightness by changing the electric current of the display. Rather than adjusting the electric current to adjust the brightness of the display, the brightness of the display can be adjusted by adjusting the RGB values of a first image corresponding to the first lighting parameter to a final image corresponding to the final lighting parameter. This will be described in more detail with reference to FIGS. 5, 6A, 6B, and 7.

The camera controller 403 is configured to control the camera module 401 by using camera operation parameters.

The camera controller 403 is configured to determine a camera operation parameter corresponding to a final lighting parameter set while an image is captured by the camera module 401. The operation of capturing an image may indicate capturing a final image.

The camera operation parameters may include, for example, at least one of a camera exposure time, variables related to a camera auto exposure (for example, an aperture and a shutter speed), and color gains (auto white balance (AWB)) for each pixel so that the camera module 401 operates in relation of lighting output by the display corresponding to the lighting parameter.

The camera operation parameters can be measured while the display operates according to the final lighting parameter, and a final camera operation parameter can be estimated by using a first camera operation parameter and a second camera operation parameter measured while the display operates according to the first lighting parameter and the second lighting parameter, respectively. The period of measuring the camera operation parameters can be determined according to the performance of an electronic device such as the number of cores and operating frequencies included in the AP 407. For example, in case of an electronic device includes a number of cores in the AP 407 and a higher processing speed, the camera operation parameter can be obtained by using a fast auto exposure (AE)/AWB algorithm while the display operates according to the final lighting parameter. However, when an electronic device includes a relatively low processing speed, the camera operation parameter can be determined in a method that determines values of the first camera operation parameter and the second camera operation parameter in advance while the display operates according to the first lighting parameter and the second lighting parameter, and a final camera operation parameter is estimated for a final image capture. For example, after measuring the first camera operation parameter and the second camera operation parameter, a specific function can be generated by using the time or sequence of frames as an input value and the measured camera operation parameter as an output value. The final camera operation parameter can be determined on the basis of an output value calculated by inputting the time or sequence of frames into the generated specific function for a final image capture.

An ISP 404 is configured to process an image captured by the camera module 401. In more detail, the display brightness can be adjusted by adjusting an RGB value of an image and controlling to output the adjusted image to the display. For example, in case of outputting a black image by setting the RGB value of a captured image to 0, the display brightness may not be great even though an electric current supplied to the display is at the maximum level. Alternatively, in case of outputting a white image by setting the RGB value of a captured image to 255, the display brightness can reach the maximum level.

The ISP 404 according to an embodiment of the present disclosure can adjust the display brightness by processing an image output to the display.

The storage unit 406 is configured to store a captured image.

The AP 407 is configured to execute an application. The AP 407 according to the present disclosure can process an application to apply a specific effect to an image captured by the camera module 401. For example, the AP 407 can generate an image brighter than the existing image by applying a transparency to the image captured by the camera module 401. Alternatively, the AP 407 can generate an image brighter than the existing image by synthesizing a white image and the image captured by the camera module 401.

Hereinafter, an electronic device for capturing an image by using a display according to an embodiment of the present disclosure is described in more detail with reference to FIGS. 5, 6A, 6B, and 7.

Figure 5:
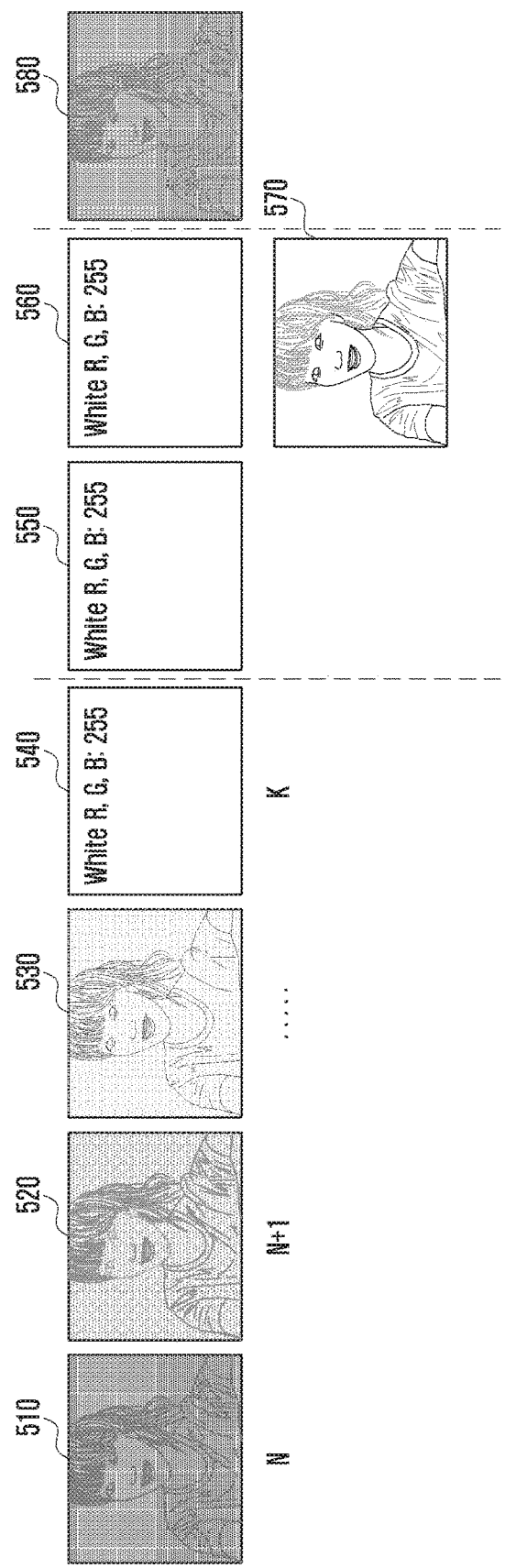
FIG. 5 illustrates images captured while controlling to gradually increase the brightness of a display according to various embodiments of the present disclosure.

FIG. 5 illustrates images captured while controlling to gradually increase the brightness of a display according to various embodiments of the present disclosure.

Referring to FIG. 5, the electronic device according to an embodiment of the present disclosure can capture a clear image from an object located in a dark place by using the illumination of the display. FIG. 5 illustrates an image 510 output to the display 402 by capturing an image with the camera module 401 according to a capture command.

Here, the image 510 may be a first image collected by the camera module after receiving an image capture signal.

Here, the image 510 may not show an object clearly in a display screen because the image 510 has been captured in a dark place.

Subsequently, the display 402 operates corresponding to a first lighting parameter, and the camera module 401 can generate the first image 520 by photographing an object lit by the display operating corresponding to the first lighting parameter and output the first image to the display 402.

The method that the display 402 operates corresponding to the first lighting parameter may be performed by outputting an image generated by changing at least one of an illuminance and a color of the image 510 to the display 402. In particular, the display 402 can operate so that an illuminance value included in the first lighting parameter can be output. Subsequently, if a predetermined time has elapsed after starting the operation corresponding to the first lighting parameter, the display 402 can start an operation corresponding to a second lighting parameter. If a predetermined time has elapsed after obtaining a first image, the display 402 can start the operation corresponding to the second lighting parameter.

Here, the operation corresponding to the second lighting parameter can be performed by outputting an image brighter than the first image 520 to the display 402. The image brighter than the first image 520 can be obtained by adjusting an RGB value of the first image 520 based on the second lighting parameter. The image brighter than the first image 520 can be output to the display 402 by processing with the ISP 404 or the AP 407.

Here, the camera module 401 can generate a second image 530 by photographing an object lit by a display operating corresponding to the second lighting parameter and output the second image 530 to the display 402.

Here, the first image 520 and the second image 530 may include outlines of the objects, and the ISP 404 or the AP 407 can set the first lighting parameter and the second lighting parameter so that the object included in the second image 530 is dimmer than the object included in the first image 520. In more detail, the RGB value increases as the first image 510 switches to the second image 520 and an afterimage showing an outline of an object may be generated and thereby the object can be shown by using the afterimage.

Subsequently, the display 402 starts an operation corresponding to a final lighting parameter. The operation corresponding to the final lighting parameter can be performed by outputting an image brighter than the second image 530 to the display 402. The image brighter than the second image can be obtained by adjusting an RGB value of the second image 530 based on the final lighting parameter. The image brighter than the second image can be output to the display 402 by processing with the ISP 404 or the AP 407.

Here, the final lighting parameter may correspond to a state that the brightness output by the display 402 reaches the maximum value or a state that the brightness output by the display 402 is a predetermined value. In FIG. 5, the final lighting parameter is assumed to be the maximum intensity of brightness output by the display 402. Accordingly, the display 402 outputs a white image like the image 540. The display 402 can display white images 550, 560 continuously.

Subsequently, at least one camera operation parameter is obtained while the display 402 operates with the final lighting parameter, and the electronic device according to an embodiment of the present disclosure can photograph an object lit by the display 402 operating with the final lighting parameter and generate a final image 570 by using the camera module 401 and the camera operation parameters.

After final image 570 is generated, the display 402 can display an image 580 which is same as the first image 510.

The final camera operation parameter can be determined also by a module control processor. For example, the module control processor can determine a camera operation parameter corresponding to the final lighting parameter of the display 402 which is set as a lighting parameter while a capturing operation is performed by the camera module 401. The capturing operation may mean an operation of capturing the image 570.

Differently from the above method, before the display 402 operates with the final lighting parameter, a camera operation parameter corresponding to the final lighting parameter can be obtained by using a first camera operation parameter obtained while capturing a first image and a second camera operation parameter obtained while capturing a second image.

Although a method for adjusting the brightness by using the ISP 404 or the AP 407 has been illustrated in FIG. 5, a color can be adjusted by using the ISP 404 or the AP 407 and camera operation parameters for photographing with a proper color temperature can be obtained in a similar method.

Here, the characteristics of the display can be adjusted by using at least one of a camera operation parameter, an ISP, an application for giving a specific effect to an image, and a display controller.

In case of photographing a bright object by using an exposure time and gain values included in camera operation parameter, the brightness of the display can be increased while outputting a captured image to the display.

Further, the brightness of the display can be increased by adjusting the brightness of an image with an ISP while outputting the image to the display.

Further, the brightness of the display can be increased with a method of editing an image to brighten the image by using an application of giving a specific effect to the image and outputting the edited image to the display.

Further, the brightness of the display can be increased by using a display controller and variables for controlling the display.

Figure 6A:
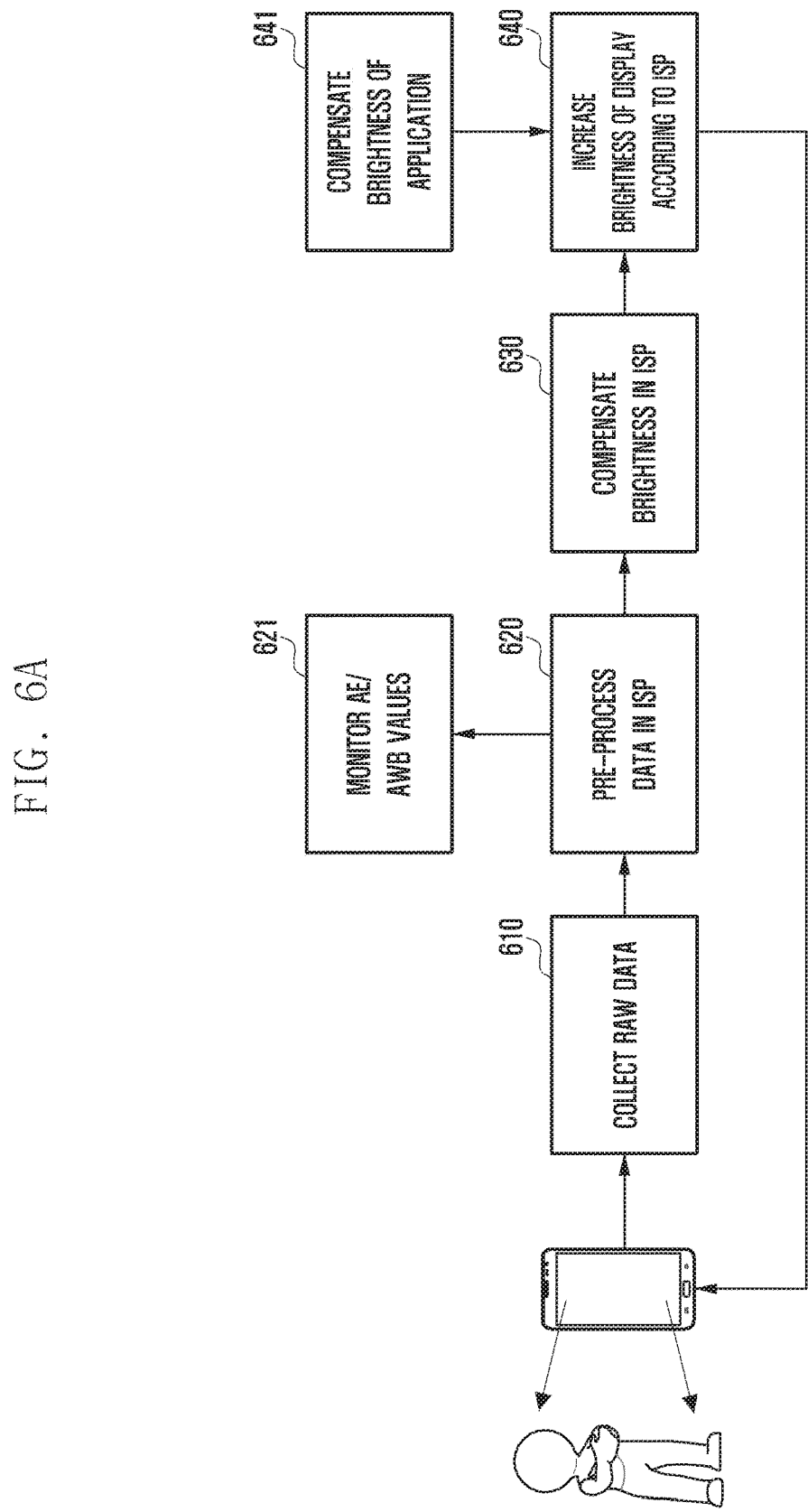
FIG. 6A illustrates a method for adjusting a display based on a first lighting parameter to a third lighting parameter according to various embodiments of the present disclosure.

FIG. 6A illustrates a method for adjusting a display based on a first lighting parameter to a third lighting parameter according to an embodiment of the present disclosure.

Referring to FIG. 6A, an image captured by a camera module 401 is obtained at operation 610 and the image is pre-processed by an ISP 404 at operation 620.

Here, the camera operation parameters can be monitored by using the result obtained from the ISP 404 pre-processing the image at operation 621.

Further, a compensation for an image brightness is performed based on the image processed by the ISP 404 at operation 630, and the brightness of the display 402 is increased by outputting the image compensated with the brightness to the display 402 at operation 640.

Here, the brightness of the display 402 can be controlled by using an application and the AP 407 can perform a compensation for the image brightness at operation 641.

Figure 6B:
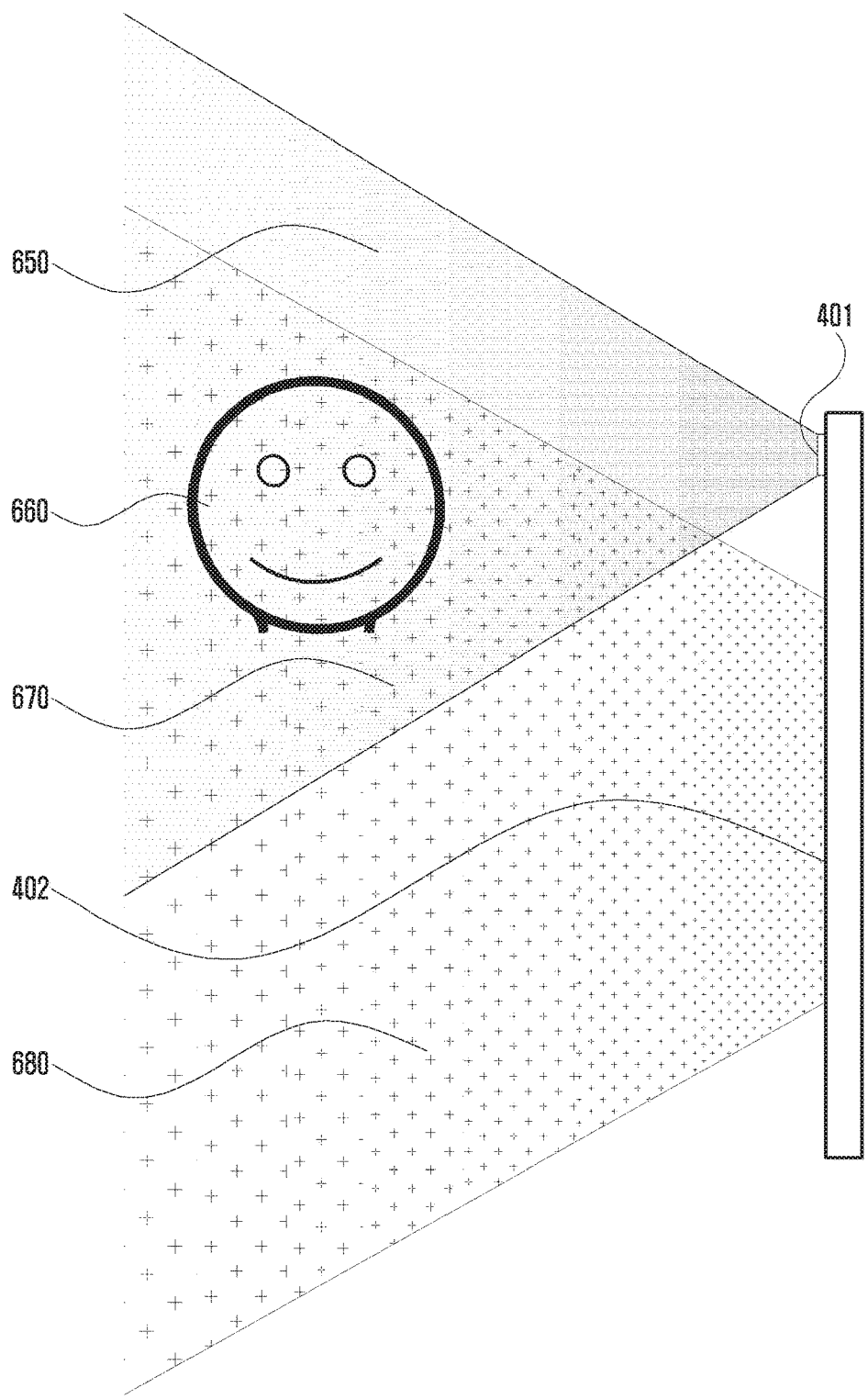
FIG. 6B illustrates an example of photographing an object by using a display of an electronic device which performs an image capture according to an embodiment of the present disclosure.

FIG. 6B illustrates an example of photographing an object by using a display of an electronic device which performs an image capture according to an embodiment of the present disclosure.

Referring to FIG. 6B, the camera module 401 of the camera module photographs an object 660 by using the light emitted by the display 402.

The display 402 operates according to at least 2 different lighting parameters in order to generate an afterimage effect for an object included in an image. The camera module 401 included in the camera module can photograph the object 660 by using the light emitted by the display 402.

The object 660 can be located in an intersecting area between an area 650 where the camera of the camera module can capture an image and an illuminating area 680 where the light is emitted by the display 402.

It may not be necessary to locate the object 660 in the area 670. For example, FIG. 6B illustrates that the object 660 is located in the area 670 to obtain an optimum photographing effect.

Figure 7:
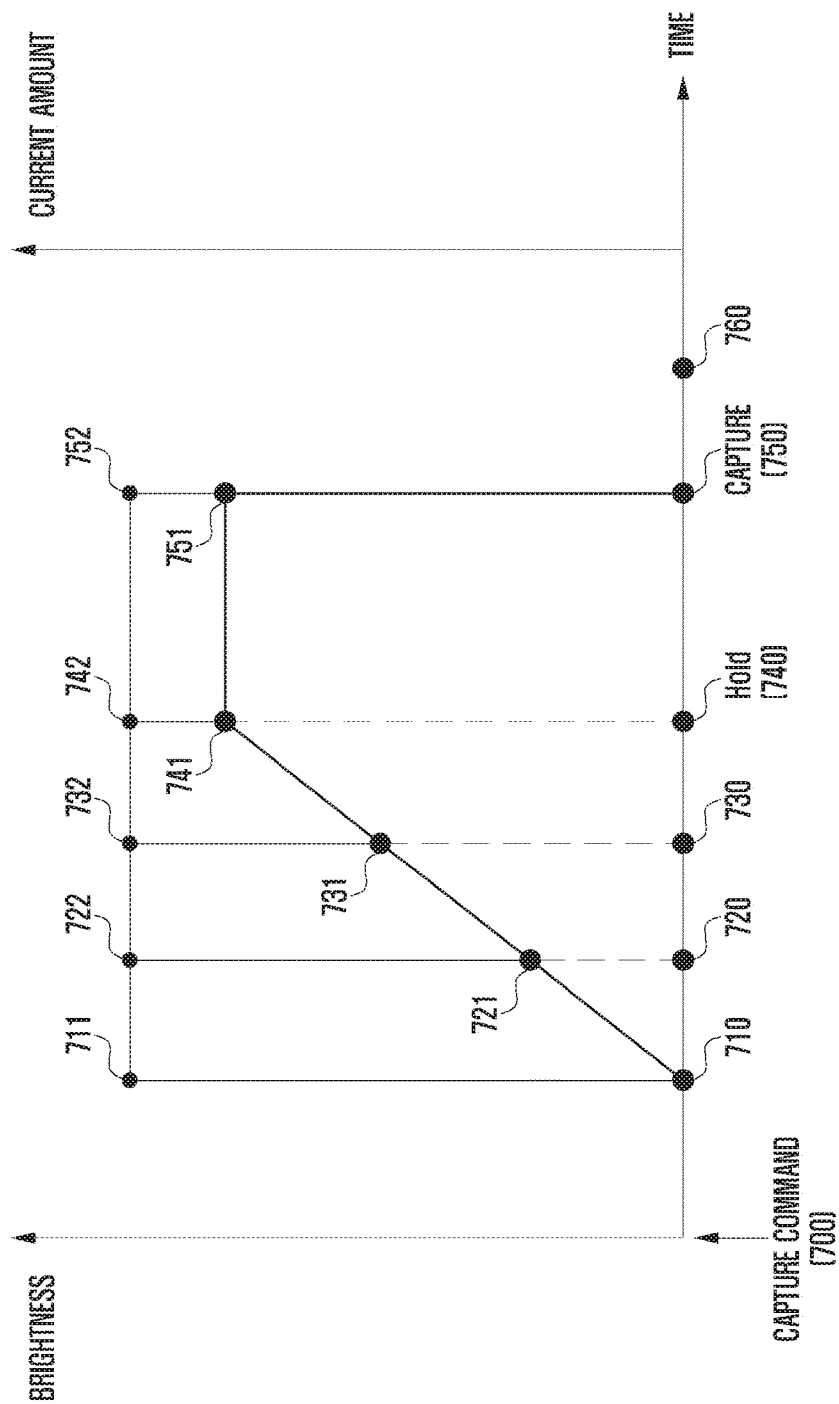
FIG. 7 is a graph illustrating changes of an image brightness and an electric current amount supplied to a display according to an embodiment of the present disclosure.

FIG. 7 is a graph illustrating changes of an image brightness and an electric current amount supplied to a display according to an embodiment of the present disclosure.

Referring to FIG. 7, the graph of FIG. 7 is configured with a time axis, brightness axis, and electric current amount axis, and shows brightness (710, 721, 731, 741, and 751) and electric current amounts (711, 722, 732, 742, and 752) of the display with respect to time (700, 710, 720, 730, 740, 750, and 760).

First, the electric current amount to be supplied to the display is described.

With reference to FIG. 7, the electric current may not be supplied to the display or a small amount of the electric current may be supplied to the display from receiving a capture command at time 700 to time 710.

After time 710, the supply of electric current to the display increases after a specific time has elapsed. However, the amount of electric current supplied to the display reaches a certain value. As shown in FIG. 7, the amount of electric current supplied to the display increases from time 710 to time 740, maintains a certain value from time 740 to time 750, and drops to 0 after capturing an image (i.e., at time 760).

As the electric current supplied to the display increases, the maximum brightness of the display increases. Namely, in the electronic device according to an embodiment of the present disclosure, the brightness of the display is fixed to a maximum value because the amount of electric current supplied to the display becomes steady from time 740 to time 750. Of course, the amount of electric current supplied to the display may become steady because the amount of electric current is maintained in a predetermined deviation range.

The display brightness is described by reference to FIG. 7.

With reference to FIG. 7, the display brightness increases gradually from time 710 to time 740.

As shown by reference number 721, the display brightness corresponding to the first lighting parameter increases to be higher than that of time 710.

As shown by reference number 731, the display brightness corresponding to the second lighting parameter increases further to be higher than that of time 720.

As shown by reference number 741, the display brightness corresponding to the final lighting parameter reaches the maximum value.

Subsequently, the electronic device according to an embodiment of the present disclosure maintains the reference brightness 741 after a specific time 740 and captures an image at a specific time 750.

After capturing the image, the display brightness is decreased to the level of the capture command at time 700.

Figure 8:
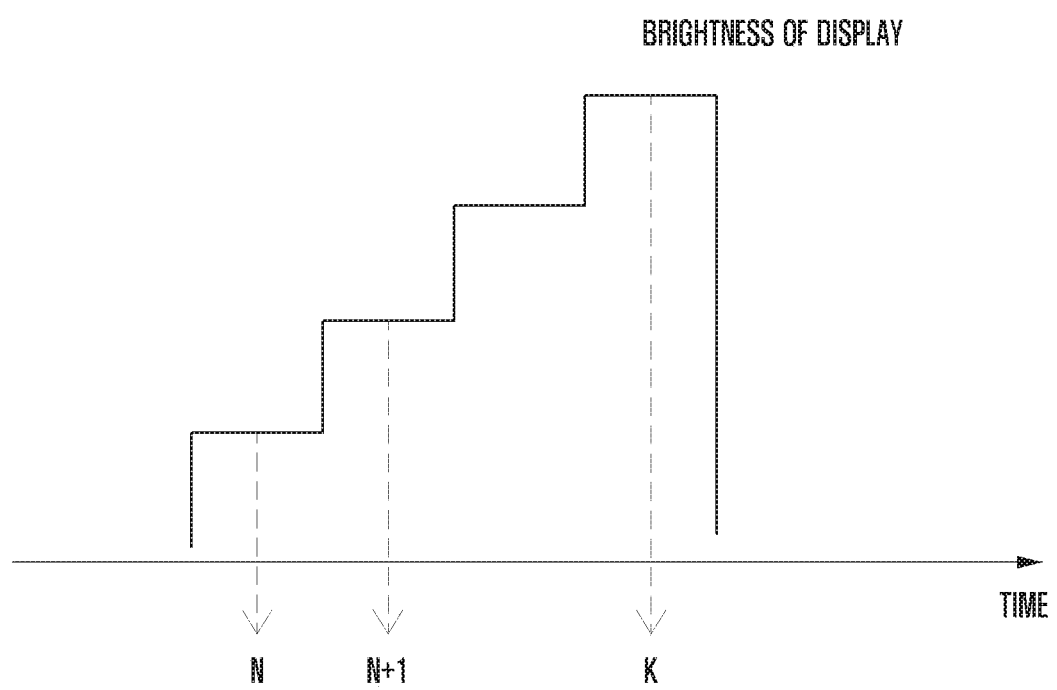
FIGS. 8, 9, and 10 are graphs illustrating various examples of increasing brightness of a display according to various embodiments of the present disclosure.
Figure 9:
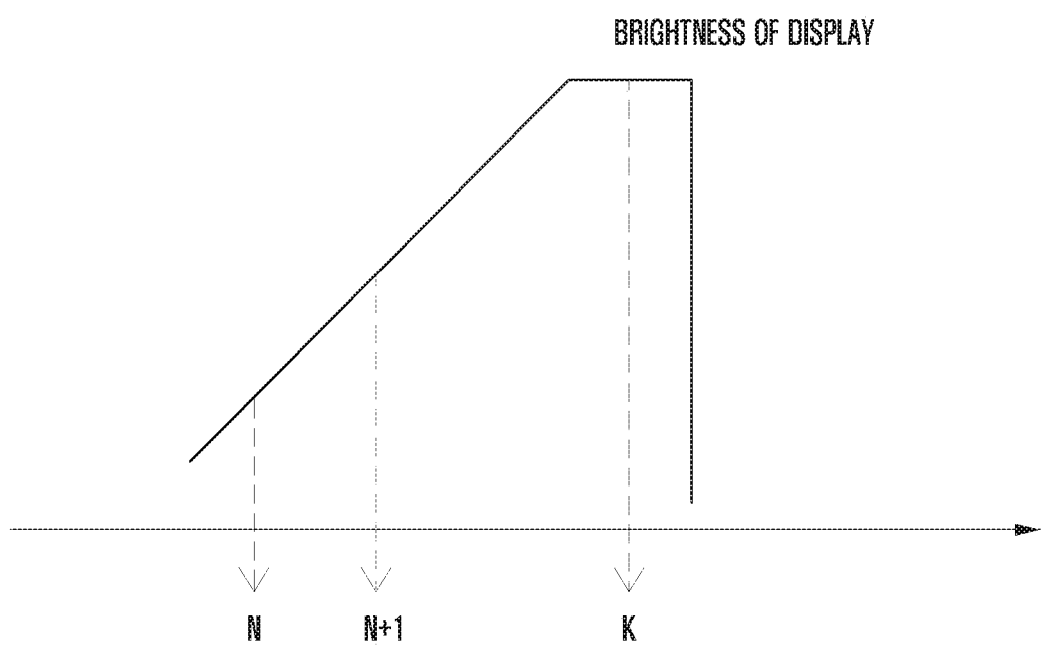
Figure 10:
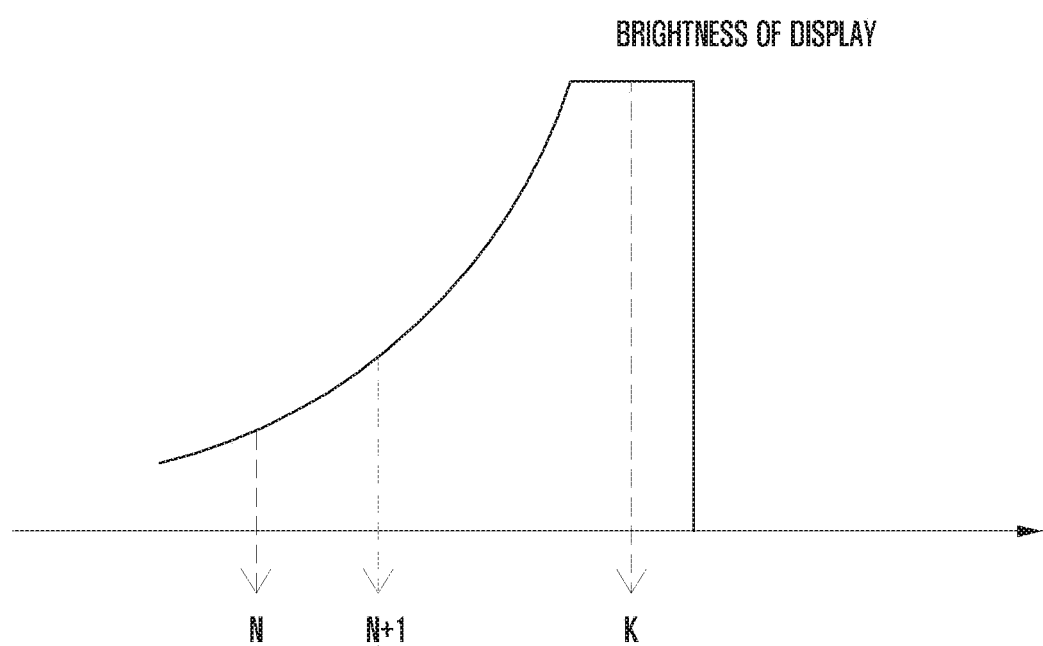

FIGS. 8, 9, and 10 are graphs illustrating various examples of increasing brightness of a display according to various embodiments of the present disclosure.

Referring to FIG. 8, the display brightness can be increased by using a synthesized step function.

Referring to FIG. 9, the display brightness can be increased by using a linear function.

Referring to FIG. 10, the display brightness can be increased by using a non-linear function.

Namely, a display parameter including a display brightness can be increased linearly or non-linearly. Here, the display brightness can be adjusted by adjusting an RGB value of an image as described above.

Figure 11:
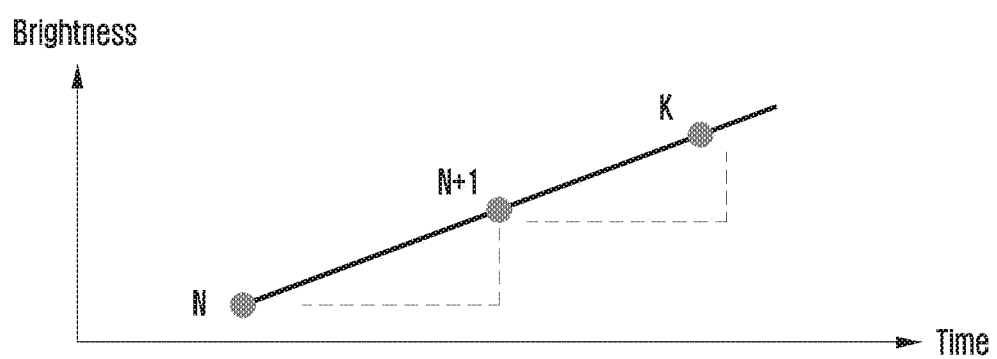
FIGS. 11 and 12 are graphs illustrating examples of obtaining camera operation parameters for each frame according to various embodiments of the present disclosure.
Figure 12:
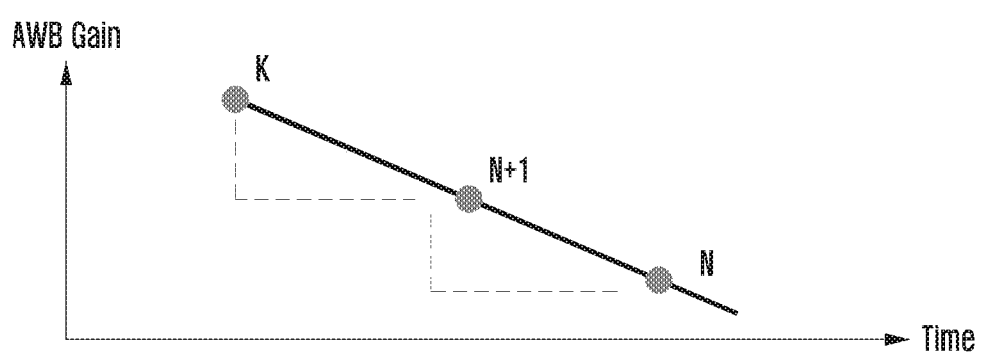

FIGS. 11 and 12 are graphs illustrating examples of obtaining camera operation parameters for each frame according to various embodiments of the present disclosure.

Referring to FIG. 11, the frame corresponds to an image obtained at a different time such as a first image and a second image.

The electronic device capturing an image by using a display according to an embodiment of the present disclosure by analyzing each frame to determine camera operation parameters.

The camera operation parameters may correspond to parameters for operating a camera by using a histogram analysis and an AE/AWB algorithm for determining a brightness of an image and a color temperature.

FIGS. 11 and 12 illustrate that the camera operation parameters change linearly as the display brightness changes linearly. Accordingly, if camera operation parameters corresponding to a first lighting parameter and camera operation parameters corresponding to a second lighting parameter are extracted, camera operation parameters corresponding to a final lighting parameter can be estimated based on the camera operation parameters corresponding to the first lighting parameter and the camera operation parameter corresponding to the second lighting parameter.

Further, the camera operation parameters can be obtained after the display brightness is increased to the maximum value without analyzing each frame. The timing of obtaining camera operation parameters can be different based on the performance of the electronic device such as the number of cores included in an AP and operating frequencies. For example, in case of an electronic device having a number of cores in the AP 407 and a higher processing speed, the camera operation parameter can be obtained by using a fast AE/AWB algorithm while the display operates according to the final lighting parameter. However, in case of an electronic device having a relatively low processing speed, the camera operation parameter can be determined in a method that determines values of the first camera operation parameter and the second camera operation parameter in advance while the display operates according to the first lighting parameter and the second lighting parameter, and a final camera operation parameter is estimated for a final image capture. For example, after measuring the first camera operation parameter and the second camera operation parameter, a specific function can be generated by using the time or sequence of frames as an input value and the measured camera operation parameter as an output value. The final camera operation parameter can be determined on the basis of an output value calculated by inputting the time or sequence of frames into the generated specific function for a final image capture.

Figure 13:
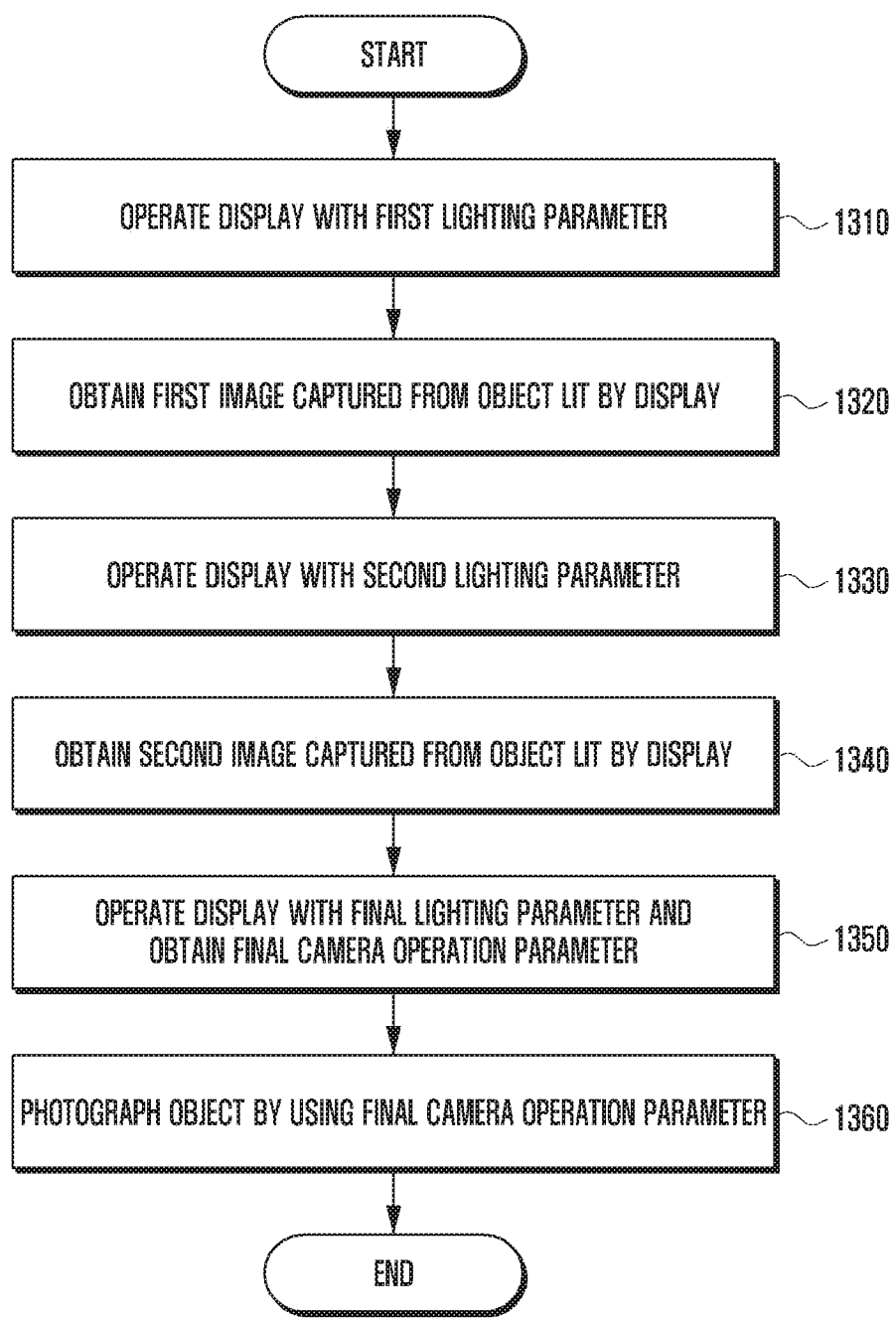
FIG. 13 is a flowchart illustrating a method for capturing an image by using a display according to an embodiment of the present disclosure.

FIG. 13 is a flowchart illustrating a method for capturing an image by using a display according to an embodiment of the present disclosure.

Referring to FIG. 13, the display initially operates with a first lighting parameter at operation 1310.

The first lighting parameter corresponds to a setting related to at least one of the brightness and color of the display.

In order to operate the display with the first lighting parameter, an image can be edited so that the brightness and color of the image captured from an object lit by the display corresponds to the first lighting parameter and the edited image can be output to the display.

Subsequently, a first image is captured from an object lit by the display operating with the first lighting parameter at operation 1320.

Subsequently, the display operates with a second lighting parameter at operation 1330.

The second lighting parameter corresponds to a setting related to at least one of the brightness and color of the display.

As a method for operating the display with the second lighting parameter, the brightness and color of the first image can be edited and the edited image can be output to the display.

The second lighting parameter can be set such that the display brightness corresponding to the second lighting parameter is greater than the display brightness corresponding to the first lighting parameter.

The second lighting parameter can be set such that the color corresponding to the second lighting parameter is brighter than the color corresponding to first second lighting parameter. Namely, the illuminance of the display operating with the second lighting parameter can be greater than the illuminance of the display operating with the first lighting parameter.

The ISP or the AP can edit the first image.

As described above, the ISP can edit the first image to a brighter image by adjusting an RGB value of an input image, and the AP can edit the first image by applying a transparency effect to the first image and synthesizing the first image with a white image.

Subsequently, a second image is obtained by capturing an object lit by the display operating corresponding to the second lighting parameter at operation 1340.

The object is included in the first image and the second image, and the outline of the object included in the second image may be dimmer than the outline of the object included in the first image because the second image is edited to be brighter than the first image. Accordingly, an object can be easily composed because the outline of the object can be output in an afterimage form while preparing an image capture.

Subsequently, camera operation parameters are obtained while the display operates with a final lighting parameter at operation 1350.

The final lighting parameter may correspond to a condition that the display outputs the maximum brightness or a predetermined brightness. Namely, the image output to the display corresponding to the final lighting parameter can be a white image or an image including a portion of an object.

The final lighting parameter may provide a display brightness higher than the display brightness corresponding to the first lighting parameter and the second lighting parameter.

In the meantime, the method for operating the display with the final lighting parameter can be performed by editing the brightness and color of the second image and outputting the edited image.

Finally, an object is captured by using the display operating with the obtained camera operation parameters and the final lighting parameter at operation 1360.

In accordance with FIG. 13, the camera operation parameter is obtained after the display operates with the final lighting parameter. However, the time for obtaining the camera operation parameter is not limited in the present disclosure. This will be described in more detail with reference to FIG. 14.

Figure 14:
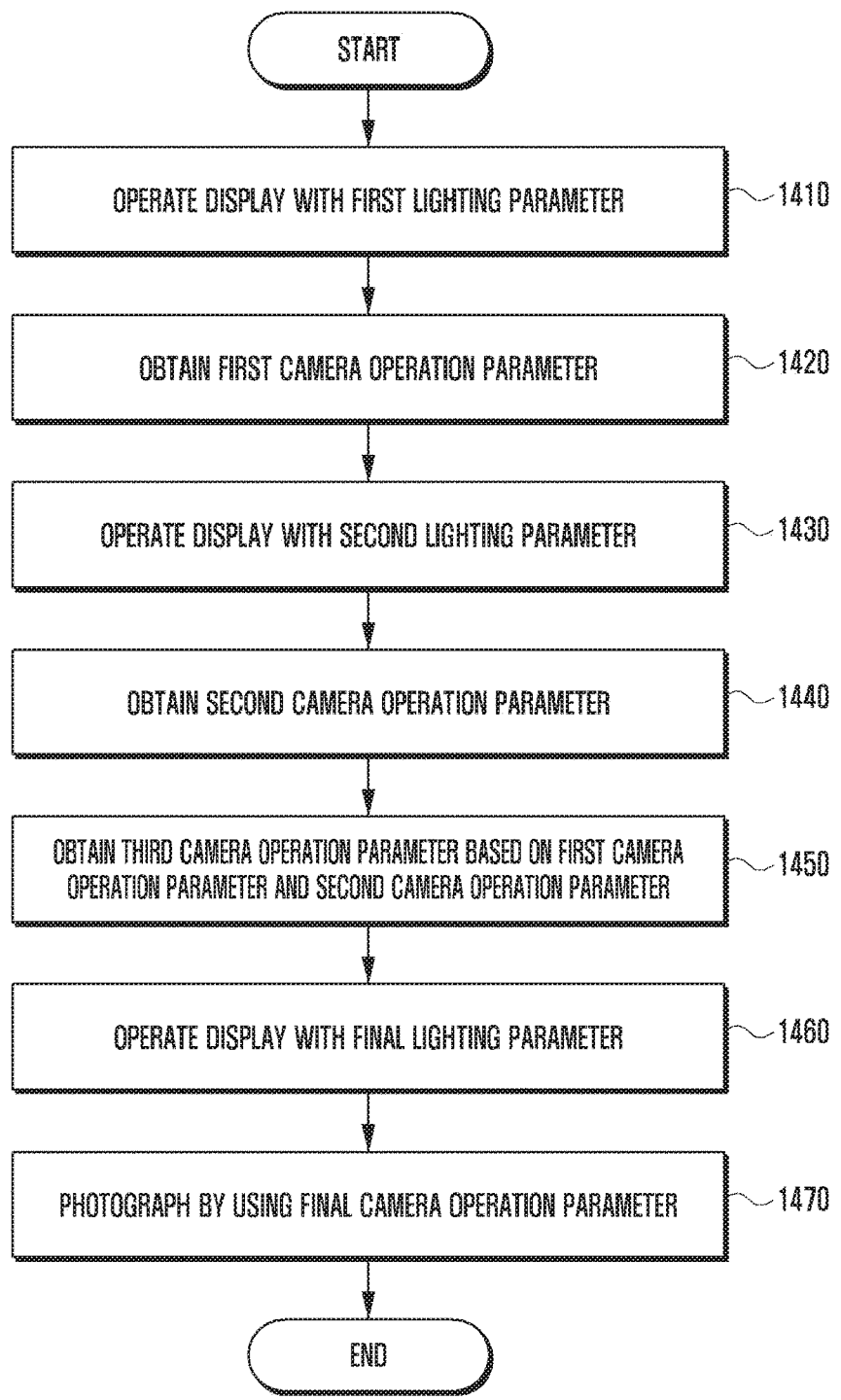
FIG. 14 is a flowchart illustrating a method for capturing an image by using a display according to an embodiment of the present disclosure.

FIG. 14 is a flowchart illustrating a method for capturing an image by using a display according to an embodiment of the present disclosure.

Referring to FIG. 14, the display operates with a first lighting parameter at operation 1410.

Subsequently, a first camera operation parameter is obtained while the display is operating with the first lighting parameter at operation 1420.

The first camera operation parameter can be obtained by analyzing an image captured by the camera module.

Subsequently, the display operates with a second lighting parameter at operation 1430, and a second camera operation parameter is obtained while the display is operating with the second lighting parameter at operation 1440.

Subsequently, a third camera operation parameter is obtained based on the first camera operation parameter and the second camera operation parameter at operation 1450.

Subsequently, the display operates with a final lighting parameter at operation 1460, and an object is captured by using the display operating with the third camera operation parameter and the final lighting parameter at operation 1460.

Referring back to FIGS. 11 and 12, the camera operation parameter may change linearly as the display brightness changes linearly. Accordingly, the camera operation parameters corresponding to the final lighting parameter can be estimated by extracting the first camera operation parameter corresponding to the first lighting parameter and the second camera operation parameter corresponding to the second lighting parameter.

Figure 15:
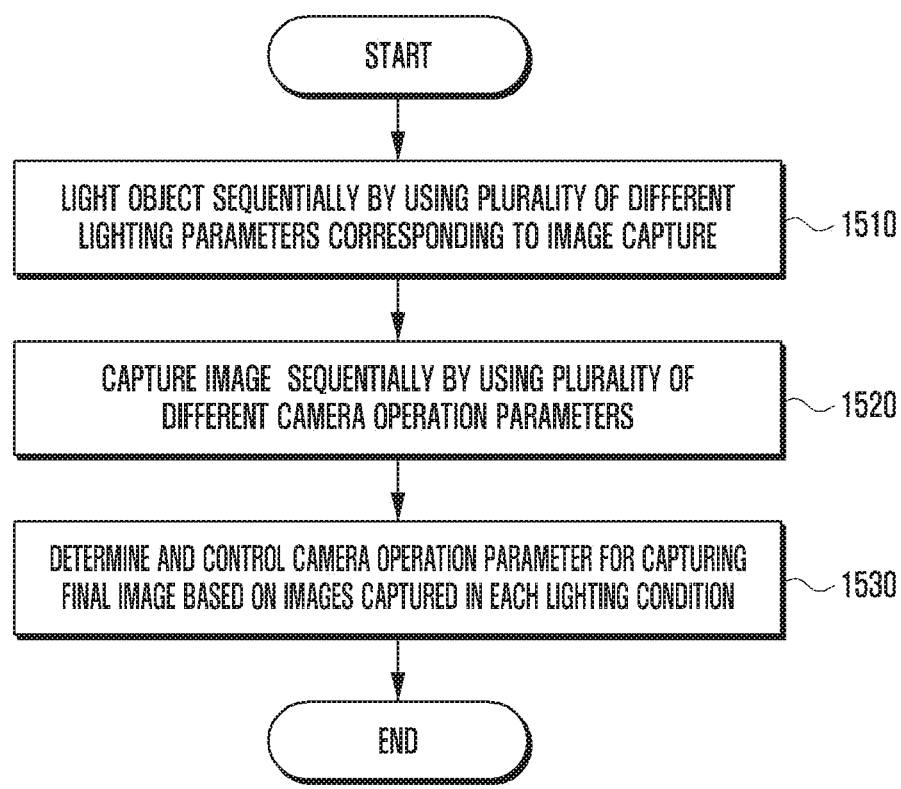
FIG. 15 is a flowchart illustrating a method for capturing an image by using a display according to an embodiment of the present disclosure.

FIG. 15 is a flowchart illustrating a method for capturing an image by using a display according to an embodiment of the present disclosure.

Referring to FIG. 15, the camera operation parameters can be determined while the display is operating corresponding to the final lighting parameter. By contrast, as discussed above with reference to FIG. 14, the camera operation parameters are estimated before the display operates corresponding to the final lighting parameter.

Initially, at operation 1510, an object is lit sequentially by using a plurality of different lighting parameters corresponding to image captures.

Images are captured sequentially by using a plurality of different camera operation parameters at operation 1520.

A final camera operation parameter for capturing an image is determined based on the images captured in a lighting condition corresponding to the lighting parameters at operation 1530.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It is noted that the various embodiments of the present disclosure as described above typically involve the processing of input data and the generation of output data. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for capturing an image by using a display, the electronic device comprising:
    a display;
    a display controller configured to operate the display using a first lighting parameter and a second lighting parameter to generate an afterimage effect for objects included in images;
    a camera configured to capture an image to be displayed by the display; and
    a processor configured to:
        control the camera to obtain a first image while the display operates using the first lighting parameter,
        determine the second lighting parameter to display an image with increased brightness of the first image,
        control the camera to obtain a second image while the display operates using the second lighting parameter,
        determine a final lighting parameter to display an image with increased brightness of the second image,
        determine a camera operation parameter while the display operates using the final lighting parameter, and
        control the camera to obtain a final image based on the determined camera operation parameter while the display operates using the final lighting parameter.

2. The electronic device of claim 1, wherein the final lighting parameter corresponds to at least one of an illuminance and a color.

3. The electronic device of claim 1, wherein the final lighting parameter corresponds to the maximum illuminance of the display.

4. The electronic device of claim 1, wherein the final lighting parameter corresponds to a predetermined illuminance of the display.

5. The electronic device of claim 1, wherein an illuminance of the second lighting parameter is greater than an illuminance of the first lighting parameter.

6. The electronic device of claim 1, wherein the processor is further configured to:
    obtain the first image by outputting an image generated by converting a red, green, and blue (RGB) value corresponding to an input image based on the first lighting parameter, and
    obtain the second image by outputting an image generated by converting an RGB value corresponding to the first image to the display based on the second lighting parameter.

7. The electronic device of claim 1, wherein the processor is further configured to control the display to generate an afterimage effect for an outline of an object included in the first image and the second image by operating the display sequentially with at least two different lighting parameters and outputting the first image and the second image to the display in a predetermined time interval.

8. The electronic device of claim 1, wherein the camera operation parameter comprises at least one of an exposure time, a color compensating parameter, a gain value of a sensor, and a white balance of the camera.

9. The electronic device of claim 1, wherein the processor is further configured to:
    estimate a final camera operation parameter corresponding to the final lighting parameter based on a function generated by using a first camera operation parameter corresponding to the first lighting parameter and a second camera operation parameter corresponding to the second lighting parameter, and
    obtain the final camera operation parameter according to a result of the estimate.

10. The electronic device of claim 8, wherein the processor is further configured to obtain the camera operation parameter corresponding to the final lighting parameter while the display operates corresponding to the final lighting parameter.

11. The electronic device of claim 8, wherein the processor is further configured to control the camera to photograph an object after the display maintains a brightness corresponding to the final lighting parameter for a predetermined time.

12. The electronic device of claim 1, wherein the display controller is further configured to supply a predetermined amount of electric current to the display.

13. The electronic device of claim 1, wherein the processor is further configured to:
control the camera to obtain a first image and a second image while the display sequentially operates based on the first lighting parameter and the second lighting parameter,
determine the camera operation parameter of the camera after obtaining the first image and the second image, and
obtain a final image based on the final lighting parameter of the display.

14. A method for capturing an image by using a display of an electronic device, the method comprising:
capturing, by a camera, a first image while the display operates using a first lighting parameter;
determining, by a processor, a second lighting parameter to display an image with increased brightness of the first image;
capturing, by the camera, a second image while the display operates using the second lighting parameter;
determining, by the processor, a final lighting parameter to display an image with increased brightness of the second image;
determining a camera operation parameter while the display is operating using the final lighting parameter; and
capturing a final image based on the determined camera operation parameter while the display is operating using the final lighting parameter.

15. The method of claim 14, wherein the final lighting parameter corresponds to at least one of an illuminance and a color.

16. The method of claim 15, wherein an illuminance of the second lighting parameter is greater than an illuminance of the first lighting parameter.

17. The method of claim 15, further comprising:
controlling the display to generate lighting by outputting an image generated by converting a red, green, and blue (RGB) value corresponding to an input image based on the first lighting parameter;
capturing the first image by using the generated lighting;
controlling the display to generate lighting by outputting an image generated by converting an RGB value corresponding to the first image to the display based on the second lighting parameter; and
capturing the second image by using the generated lighting.

18. The method of claim 15, further comprising:
controlling the display to operate sequentially based on the first lighting parameter and the second lighting parameter; and
outputting a first image and a second image captured by the camera in a predetermined time interval to generate an afterimage effect for an outline of an object included in the first image and the second image.

* * * * *